June 4, 1957 T. G. A. SILLERS 2,794,872
REVERSIBLE BREAKER PANEL FOR DRAWOUT TYPE SWITCHGEAR
Filed Oct. 25, 1954 2 Sheets-Sheet 1

Inventor
Thomas G. A. Sillers
by Egon W. Mueller
Attorney

June 4, 1957 T. G. A. SILLERS 2,794,872
REVERSIBLE BREAKER PANEL FOR DRAWOUT TYPE SWITCHGEAR
Filed Oct. 25, 1954 2 Sheets-Sheet 2
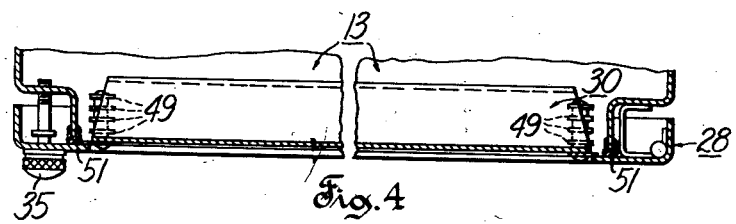
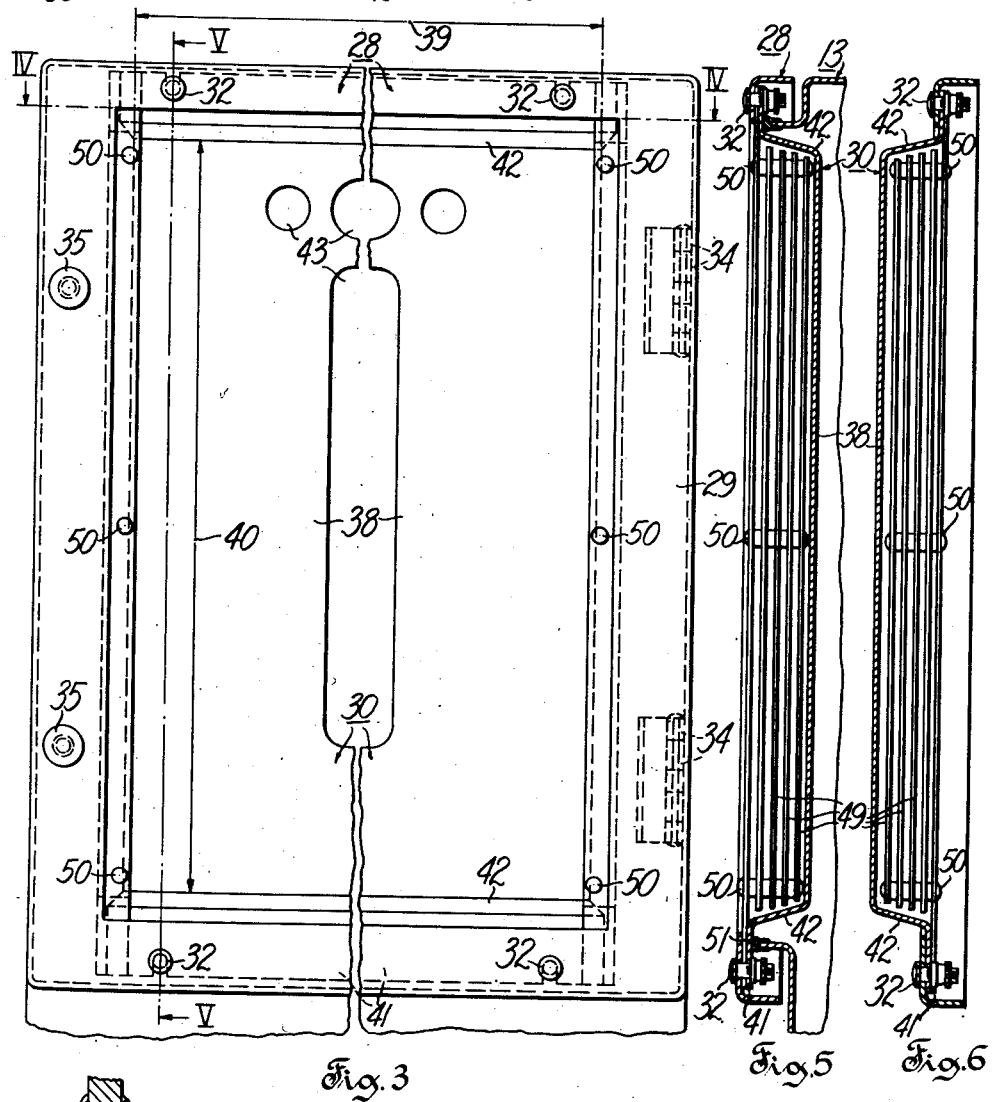
Inventor
Thomas G. A. Sillers
by Egon W. Mueller
Attorney United States Patent Office 2,794,872
Patented June 4, 1957

2,794,872
REVERSIBLE BREAKER PANEL FOR DRAWOUT TYPE SWITCHGEAR

Thomas G. A. Sillers, Wauwatosa, Wis., assignor to Allis-Chalmers Manufacturing Company, Milwaukee, Wis.

Application October 25, 1954, Serial No. 464,295

6 Claims. (Cl. 200—50)

This invention relates generally to improvements in metal clad switchgear of the drawout type and more particularly to the combination of cubicle mounted switchgear components and panel doors therefor.

It is customary in both indoor and outdoor switchgear equipment to provide metal cubicles for housing the various switchgear components, such as switches or circuit breakers and the like. It is further usual to provide a panel door for each switch enclosed in a switchgear unit.

When the panel door is closed, energized portions of the switch are enclosed for the protection of operating personnel and to maintain acceptable atmospheric conditions. In some types of the drawout switchgear, when equipped with a conventional door hinged at a fixed position onto the cubicle, it is necessary to open the door in order to move or withdraw the switch on its mounting to a disconnected position. In the disconnected position the switch then projects beyond the door hinge making it impossible to close the door. This situation is highly undesirable as the energized portions of the switchgear are then exposed and present dangerous areas to possible contact by the operating personnel.

Attempted solutions of this problem have included provision for a large enough cubicle to permit withdrawal of the switch to its fullest extent without requiring opening of the panel door. This solution is unsatisfactory for two reasons. First, the space is at a premium requiring minimal sized cubicles and, second, in the operating position of the switch the manual control means will be spaced at considerable distance from the door. Operation of the operating portions or manual control means on the switch becomes difficult and unsafe. This condition necessitates addition of linkage means between the door and manual control means on the switch. Such linkage systems have been used commercially but their application involves complications in design and in operation and maintenance. Further, when it becomes necessary to replace the switch by one of a rating other than the original, a complete new set of linkages may have to be designed and built to effect proper operation. Accordingly, this approach is commercially unfeasible.

Another approach to this problem is shown in Volgovskoy, U. S. 2,533,645, in which the door panels themselves are movable to permit limited movement of the switch. However, the entire unit must be enclosed in an additional housing which also requires a main door for accessibility to the panel door of the switch.

The present invention overcomes the disadvantages of the prior art and furnishes maximum protection to operating personnel and aids to maintain acceptable atmospheric conditions within the cubicle housing the switchgear.

The present invention provides a door frame mounted on a cubicle housing a removable switch. A reversible panel having a dished portion, edge portions and side portions is mounted in the door frame. The side portions connect the dished portion with the edge portions. The dished portion is further provided with cutout sections for receiving components of the switch, such as indicator lights, trip and reset buttons and the operating handle.

The switch, a part of the combination comprising the invention, is normally required to be positioned in three positions in relation to its primary contacts and the cubicle, namely, a connected position, a test position and a disconnected position. In a connected position the dished portion of the reversible panel is dished inwardly to enclose the switch. In a test position the main contacts of the switch are disconnected from the primary contacts, the auxiliary contacts, however, remaining connected thus providing a position of the switch in which the controls for tripping the switch may be tested. Therefore, in a test position, the reversible panel is removed from the door frame and the dished portion reversed so as to dish it outwardly away from the switch. In the third, or completely disconnected position, the dished portion remains dished outwardly away from the switch. In the last position all of the electrical contacts are broken.

The door frame therefor, with its reversible panel, cooperates with the switch components to provide in all of these positions, connect, test and disconnect, constant protection from the energized portions of the switch, therefore, providing maximum protection for the operating personnel.

Accordingly, it is an object of this invention to provide a new door frame with a reversible panel mounted therein which will permit operation of a switch housed in a cubicle in a connect, test and disconnect position while affording maximum protection for the operating personnel.

Another object of the invention is to provide a door frame mounting a reversible panel cooperating with switchgear mounted in a cubicle in such a manner as to prevent exposure of the energized portion of the switchgear in any of the desired positions in which the switch may be positioned.

Another object of the invention is to provide a door frame having a reversible panel, which panel cooperates with the cubicle to provide a seal therebetween to prevent an undesired escape path and to direct a desired escape path of any gases, which may be generated by the switchgear.

Objects and advantages other than those above set forth will be apparent from the following description when read in connection with the accompanying drawings, in which:

Fig. 3 is an enlarged fragmentary view in elevation showing the door frame mounting a reversible panel therein;

Fig. 4 is a view in section along line IV—IV of Fig. 3;

Fig. 5 is a view in section along line V—V of Fig. 3;

Fig. 6 is a modification of Fig. 5 showing the reversible panel dished outwardly from the switchgear;

Fig. 9 is an enlarged view in section of the seal means carried by the cubicle;

Figures 1, 2:
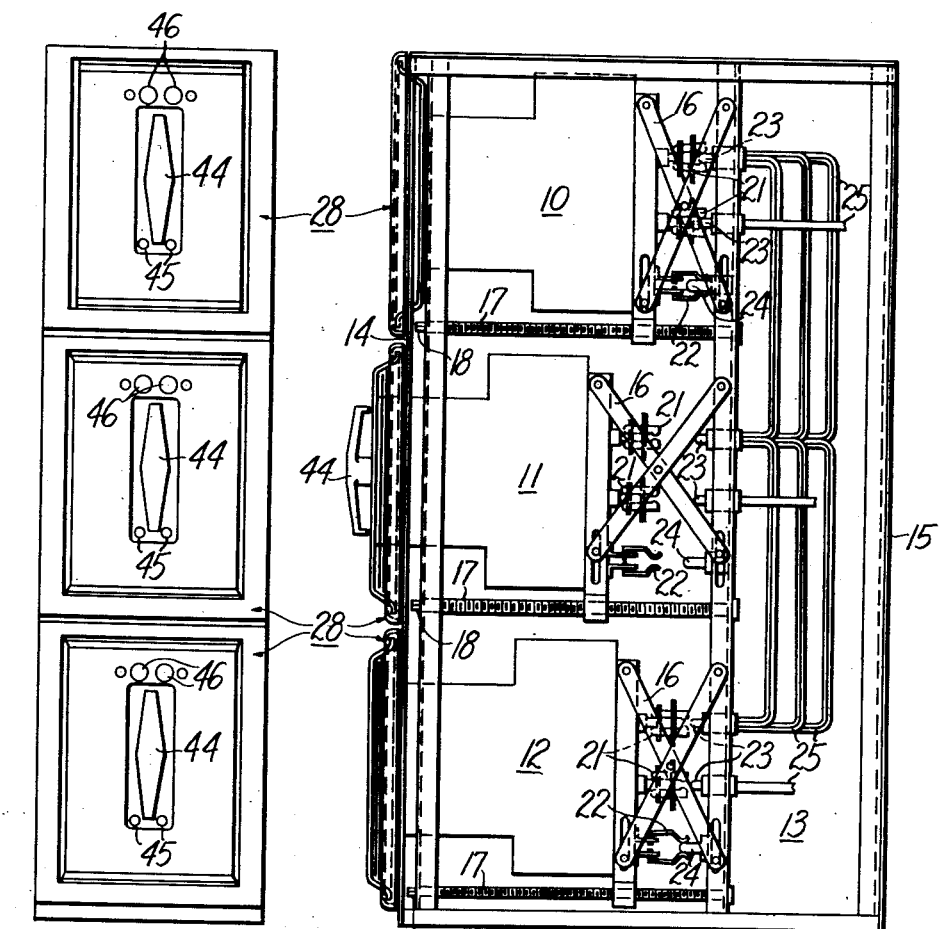
Fig. 1 is a side elevational view of a switchgear cubicle embodying the invention.
Fig. 2 is a frontal view of the switchgear cubicle of Fig. 1.

Figs. 1 and 2 of the drawings show a conventional arrangement of low voltage switchgear. The illustrated switchgear includes three circuit breakers or switches 10, 11 and 12 movably mounted in a cubicle 13 having a front 14 and a rear 15.

Switches 10, 11 and 12 are movably mounted in cubicle 13 by supporting means which wholly supports an individual switch 10, 11 or 12 and permits movement of the switch relative to cubicle 13. Any known type of supporting means may be utilized to effect the required movement. The present invention utilizes pairs of conventional pantographs 16. The pantographs 16 are pivotally attached to cubicle 13 and switches 10, 11 and 12. Accordingly, an individual switch may be moved from its normal operating position as shown by switch 10, to a disconnect position as shown by switch 11, or to a test position such as shown by switch 12, supported by pantographs 16 and moved by any suitable means for actuating the supporting means to bodily shift the switch from the energized or connect position into the test position or into the disconnect position.

The means for actuating the supporting means may include any suitable known drawout structure such as screws 17 which are threaded through a portion of individual switch 10, 11 or 12 and journaled and carried by cubicle 13. Screws 17 may be rotated by a crank (not shown) which may be fitted and detachably connected to a squared portion 18 normally accessible at front 14 of individual switches 10, 11 or 12 in cubicle 13. Operation of screw 17 permits individual switches 10, 11 or 12 to be bodily shifted from the energized or connect position of switch 10 into the deenergized or disconnect position of switch 11.

The several positions of an individual switch 10, 11 or 12 permit selective placement of primary and auxiliary contacts 21, 22 of switch 10, 11 or 12 with respect to circuit fixed primary and auxiliary contacts 23, 24.

A schematic showing is made of the connections of primary and auxiliary contacts 21, 22 connecting individual switches 10, 11 and 12 to circuit primary contacts 23 presented by the circuit to be protected and to auxiliary contacts 24, respectively. The circuit primary contacts 23 are shown connected to representative three phase bus bars 25 connecting the circuit with switches 10, 11 and 12. Circuit auxiliary contacts 24 are provided for the various control signals and responses necessary to operate switch 10, 11 or 12.

In all positions of switch 10, 11 or 12 contacts 21, 22 are in alignment with and connect by sliding frictional engagement with their mating contacts 23, 24. Switch 10 illustrates the connect position in which both primary and auxiliary contacts 21, 22, 23 and 24 are connected. Switch 11 illustrates the position of the switch in the disconnect position with all contacts open. And switch 12 illustrates the test position wherein the primary contacts 21, 22 are disconnected, but the auxiliary contacts 22, 24 are still connected. The test position permits actual operation of the control circuits of switch 10, 11 or 12.

Figure 7:
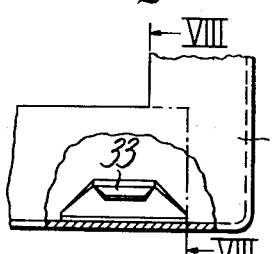
Fig. 7 is an enlarged fragmentary view of a modification of means for mounting and fastening the reversible panel in the door frame.
Figure 8:
Fig. 8 is a view in section along line VIII—VIII of Fig. 7.

The requirement of being able to position switch 10, 11 or 12 in three positions with respect to the primary and auxiliary contacts 21, 22, 23 and 24 gives rise to the present invention. Each individual switch is provided with a panel door 28 mounted on cubicle 13 to provide a means of access to switch 10, 11 or 12. Panel door 28 shown in detail in Figs. 4 through 6, includes a door frame 29 carried on cubicle 13 and a reversible panel 30 mounted in and carried by door frame 29. Means are provided for selectively mounting and fastening reversible panel 30 in door frame 29. These means may include a plurality of thumb screws 32 as shown in Figs. 5 and 6 or a plurality of spring clips 33 as shown in Figs. 7 and 8. Door frame 29 is further mounted by means of hinges 34 to cubicle 13 and is held in closed relation with cubicle 13 by closure screws 35.

Reversible panel 30 has a particularly novel construction which includes a dished portion 38 which has a first predetermined dimension 39 and a second predetermined dimension 40 which is greater than the first predetermined dimension 39. Panel 30 also includes edge portions 41 forming a generally rectangular configuration extending along dimension 39 at the upper and lower part of dished portion 38. Side portions 42 connect dished portion 38 along the first predetermined dimension 39 to edge portions 41. Dished portion 38 is provided with cutout sections 43 to receive the components of switch 10, 11 or 12, such as an operating handle 44, reset and trip buttons 45, indicate lights 46 and the like, all illustrated in Fig. 2.

A plurality of spaced apart louvers 49 are included in panel 30 and are mounted by suitable means, such as rivets 50, on edge portions 41. Louvers 49 are positioned intermediate dished portion 38 adjacent the second predetermined dimension 40 and edge portions 41 corresponding thereto. The louvers 49 have flat surfaces disposed parallel to dished portions thereby to aid in directing the path of escape of any hot gases or flashes generated by switch 10, 11 or 12 during operation thereof.

A seal means, such as a gasket 51, shown in Figs. 4, 5 and 9, is mounted adjacent front 14 of cubicle 13 and, being a continuous gasket presented to edge portions 41 of panel 30 along first predetermined dimension 39 and presented to panel frame 29 along second predetermined dimension 40, seals cubicle 13 to panel 30. The seal means further prevents the undesired escape of hot gases or flashes except through the louvers.

The invention described is utilized in operation when dished portion 38 of panel 30 is selectively dished toward rear 15 and outwardly of front 14 of cubicle 13 depending upon the position of the switch 10, 11 or 12. With switch 10 positioned in the connect position as shown in Fig. 1, dished portion 38 of reversible panel 30 is dished toward rear 15 of cubicle 13, as shown in Figs. 1 and 5, and handle 44 of switch 10 being substantially housed by panel door 28.

When it is desired to move the switch to the disconnect position, as shown by switch 11 in Fig. 1, door 28 is opened and panel 30 is removed from door frame 29 by removing thumb screws 32. Panel 30 is reversed in the door frame with dished portion 38 dished outwardly away from front 14 as shown in Fig. 6 and mounted and fastened in door frame 29 by replacing thumb screws 32. The switch 11 is then moved forward to the disconnect position by rotating screw 17 with pantographs 16 supporting switch 10, 11 or 12 in horizontal travel, as shown in Fig. 1. This movement effects separation of primary and auxiliary contacts 21, 22, 23 and 24, the switch then being in the disconnect position.

To effect the test position as illustrated by switch 12, it is merely necessary to move the switch by means of screw 17 from the disconnect position toward rear 15 of cubicle 13 until auxiliary contacts 22 contact the circuit auxiliary contacts 24.

Figure 11:
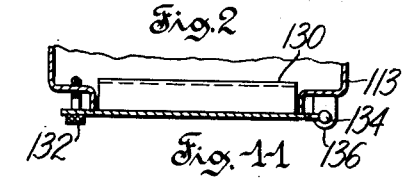
Fig. 11 is a view in section along line XI—XI of Fig. 10.
Figure 10:
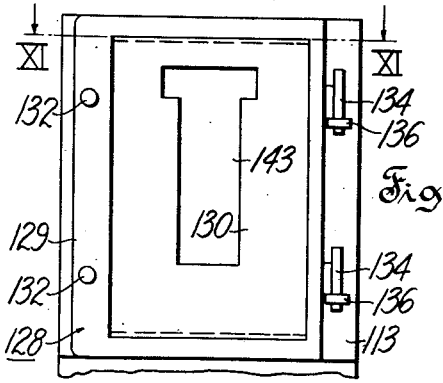
Fig. 10 is a fragmentary view in elevation of a modification of the invention in which the door frame and panel are integral.

Figs. 10 and 11 show a modification of the invention in which a panel door 128 has it door frame 129 made integral with reversible panel 130. The door 128 is carried by its hinge members 134 which in turn are carried in hinged relation to cubicle 113 by hinge supports 136 presented by cubicle 113. The panel door is fastened to cubicle 113 by thumb screws 132. Panel 130 is provided with a modified cut out section 143 for receiving the desired switchgear components.

Panel door 128 is illustrated as being dished inwardly. Should it be desired to reverse the dishing thereof, door 128 may be removed by disengaged thumb screws 132 and lifting hinge members 134 from hinge supports 136, turn the door end over end so that it dishes outwardly and reinsert members 134 in supports 136.

It is evident that the described invention provides a simple solution of the problem of enclosing drawout type switchgear for all positions of a switch. In addition, it provides an inexpensive and practical means without resorting to complicated linkages or other devices necessary when a single hinged panel is utilized.

Various changes and modifications may be made in the embodiment illustrated herein without departing from the spirit of the invention or from the scope of the appended claims.

It is claimed and desired to secure by Letters Patent:

1. In drawout switchgear, the combination including a cubicle having a front and a rear, a circuit breaker mounted in said cubicle selectively positionable to vary electrical connections thereto by movement of said circuit breaker toward said front or said rear, a dished portion means having cutout sections receiving components on the front of said circuit breaker, and means for reversibly mounting said dished portion means on the front of said cubicle to vary the front to rear position of said cutout sections to correspond to the selective positioning of said circuit breaker.

2. In drawout switchgear, the combination including a cubicle having a front and a rear, a circuit breaker mounted in said cubicle selectively positionable to vary electrical connections thereto by movement of said circuit breaker toward said front or said rear, a reversible panel including a dished portion having cutout sections receiving components on the front of said circuit breaker, and means for reversibly mounting said panel on the front of said cubicle to vary the front to rear position of said cutout sections to correspond to the selective positioning of said circuit breaker.

3. In drawout switchgear, the combination including a cubicle having a front and a rear, a circuit breaker mounted in said cubicle selectively positionable to vary electrical connections thereto by movement of said circuit breaker toward said front or said rear, a door frame hingedly mounted on the front of said cubicle, a reversible panel including a dished portion having cutout sections receiving components on the front of said circuit breaker, and a plurality of thumb screws mounted on said frame for reversibly mounting said panel on said door frame to vary the front to rear position of said cutout sections to correspond to the selective positioning of said circuit breaker.

4. In drawout switchgear, the combination including a cubicle having a front and a rear, a circuit breaker mounted in said cubicle selectively positionable to vary electrical connections thereto by movement of said circuit breaker toward said front or said rear, a door frame hingedly mounted on the front of said cubicle, a reversible panel including a dished portion having cutout sections receiving components on the front of said circuit breaker, and a plurality of spring clips mounted on said frame for reversibly mounting said panel on said door frame to vary the front to rear position of said cutout sections to correspond to the selective positioning of said circuit breaker.

5. In drawout switchgear, the combination including a cubicle having a front and a rear, a circuit breaker mounted in said cubicle selectively positionable to vary electrical connections thereto by movement of said circuit breaker toward said front or said rear, a door frame hingedly mounted on the front of said cubicle, a reversible panel including a dished portion having cutout sections receiving components on the front of said circuit breaker, said dished portion having a first dimension and a second dimension, a plurality of spaced apart louvers intermediate said dished portion and said frame along said first dimension of said dished portion, and means for reversibly mounting said panel at said second dimension to said door frame to vary the front to rear position of said cutout portion to correspond to the selective positioning of said circuit breaker.

6. In drawout switchgear, the combination including a cubicle having a front and a rear, a circuit breaker mounted in said cubicle selectively positionable to vary electrical connections thereto by movement of said circuit breaker toward said front or said rear, a door comprising a reversible panel including a dished portion having cutout sections receiving components on the front of said circuit breaker, and means for reversibly mounting said door on the front of said cubicle to vary the front to rear position of said cutout portions to correspond to the selective positioning of said circuit breaker.

References Cited in the file of this patent
UNITED STATES PATENTS

| | | |
|---|---|---|
| 2,533,645 | Volgovskoy | Dec. 12, 1950 |
| 2,630,235 | Beber et al. | Mar. 3, 1953 |